Oct. 18, 1966 C. B. HENN 3,279,148
BELT LOADING MACHINES
Filed Sept. 12, 1963 7 Sheets-Sheet 4

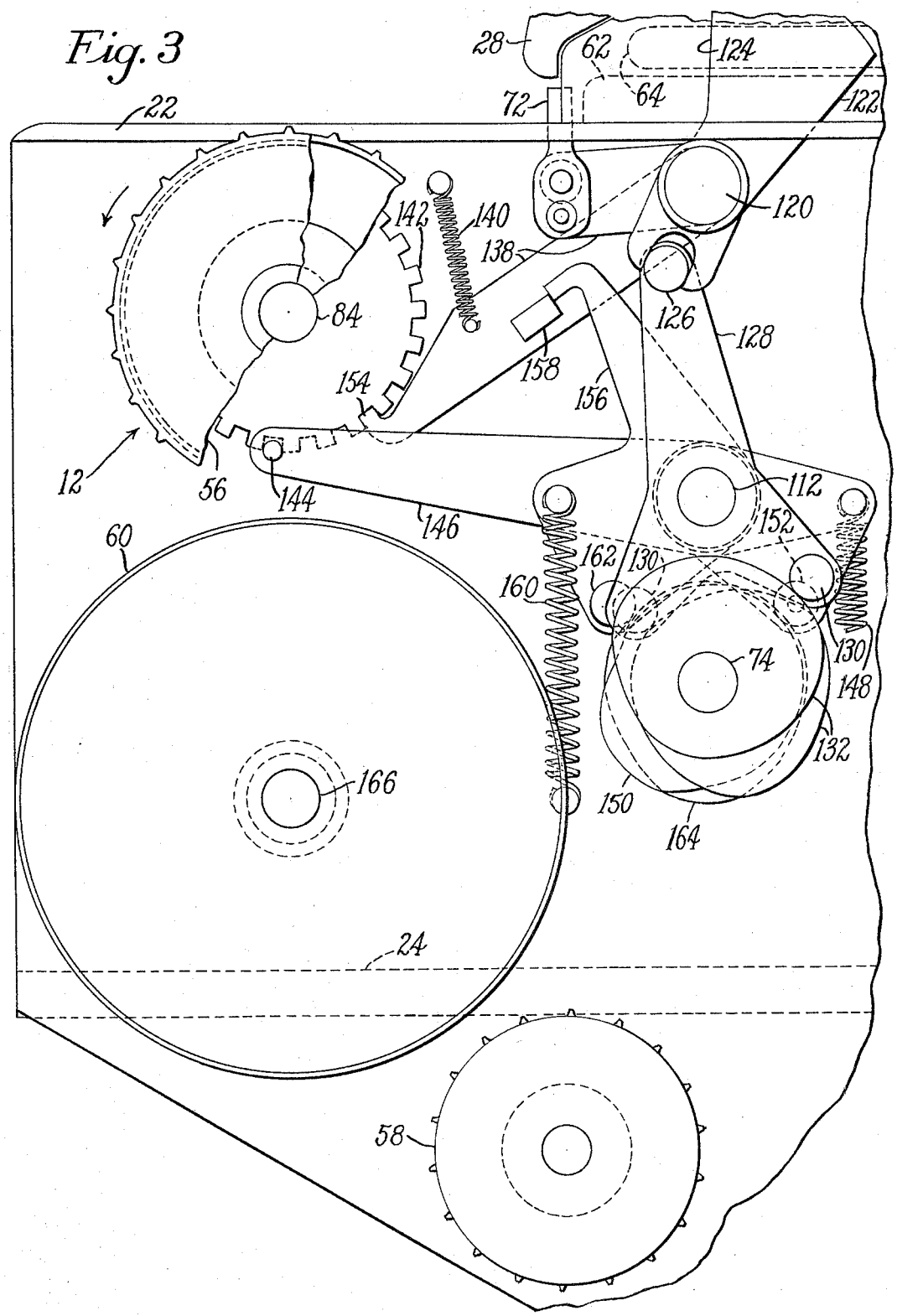

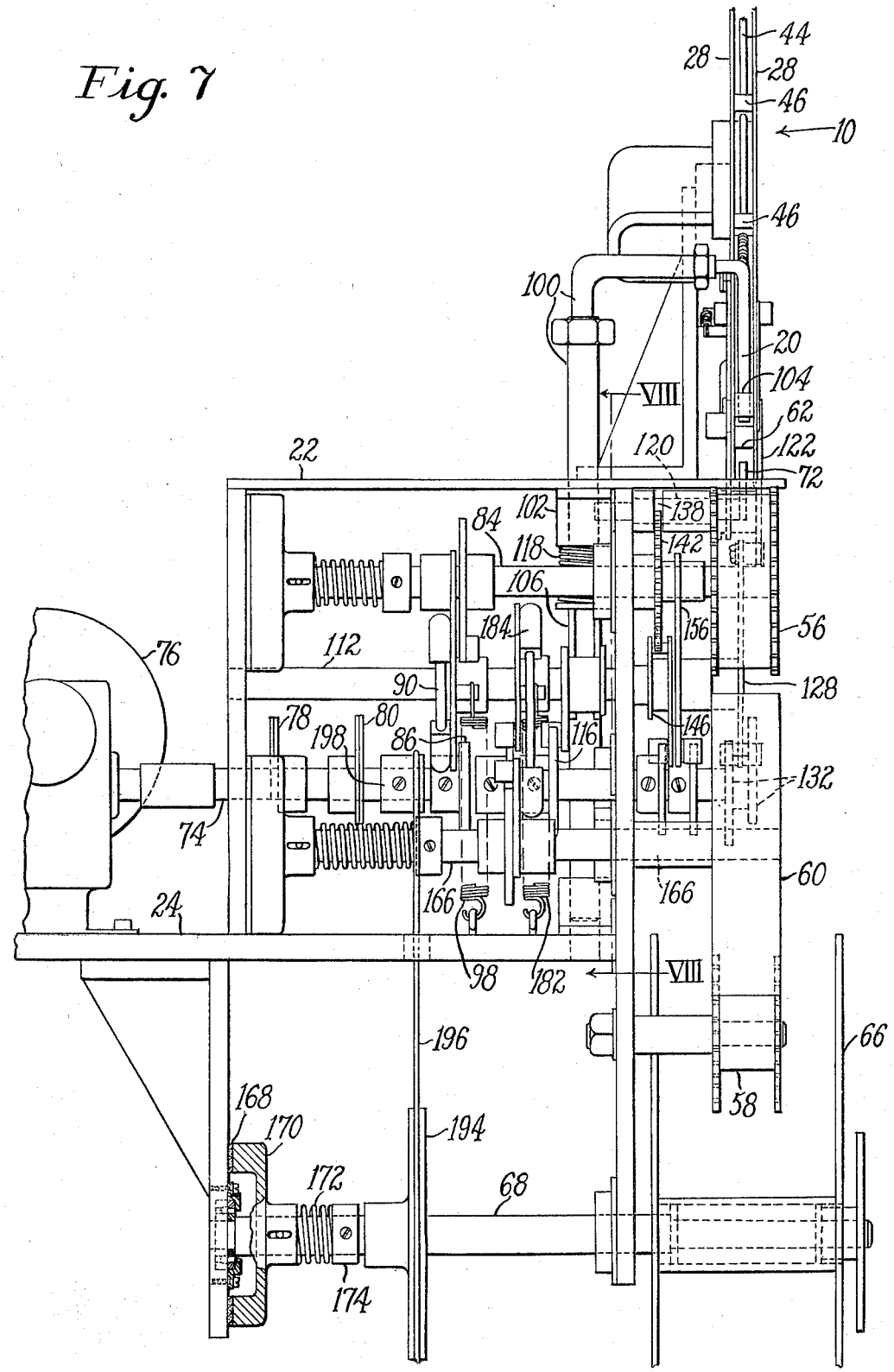

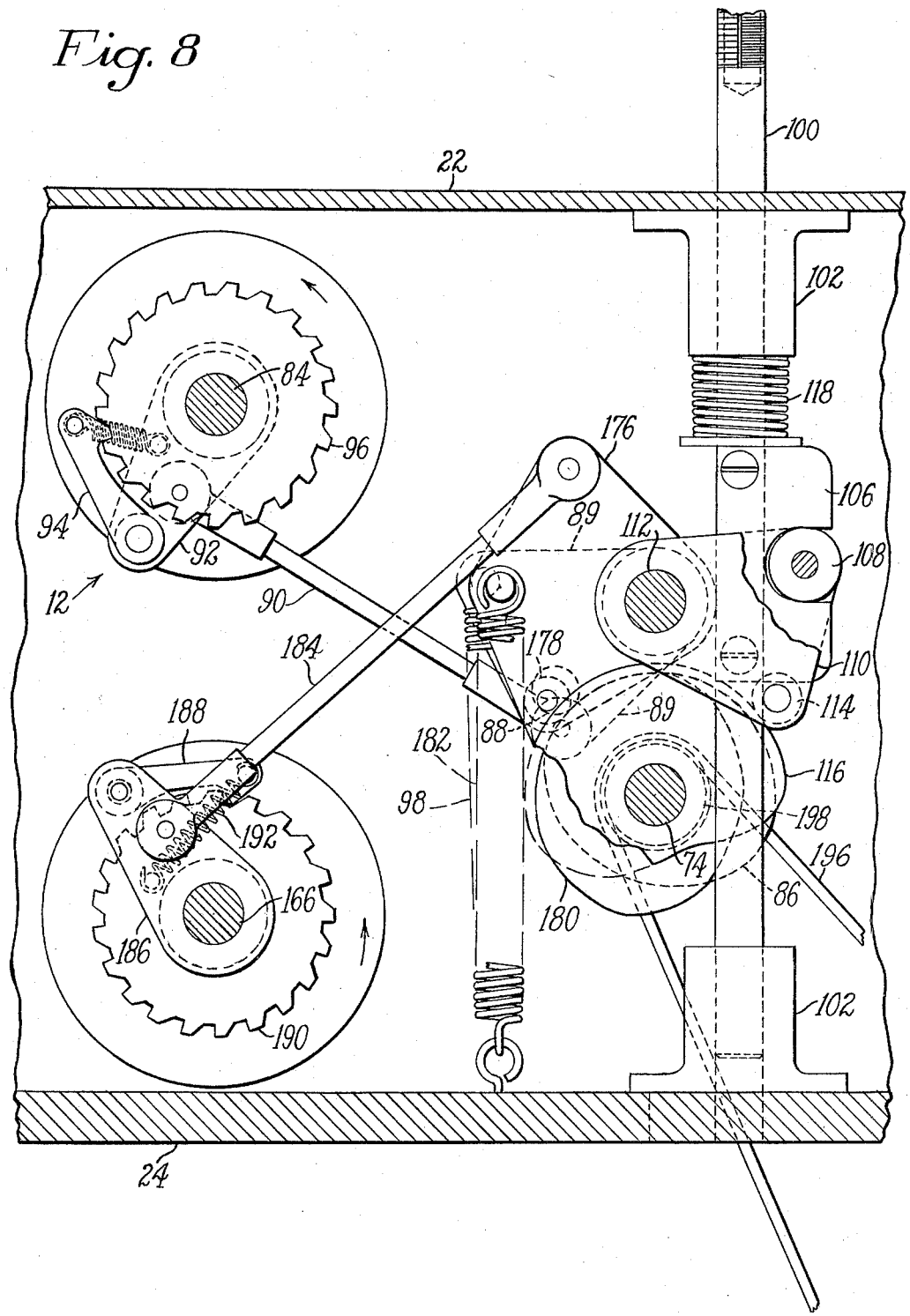

United States Patent Office 3,279,148
Patented Oct. 18, 1966

3,279,148
BELT LOADING MACHINES
Cecil B. Henn, Dayton, Ohio, assignor to United Shoe Machinery Corporation, Boston, Mass., a corporation of New Jersey
Filed Sept. 12, 1963, Ser. No. 308,589
3 Claims. (Cl. 53—252)

This invention relates to machines for mounting articles in spaced relation on a strip of material, and more particularly to mechanism for successively loading work pieces such as coaxial lead type electronic components in a feed belt adapted to receive them in parallel arrangement. Although the invention is herein illustrated as embodied in a machine for loading articles provided with similarly shaped bodies and oppositely extending flexible projections of like shape, it will be understood that application of the invention is not limited to loading electrical components nor to loading any particular form of work piece.

When small articles in large quantities are to be individually used in assembly or other work, it is highly convenient to have them fed seriatim to the point of application by combined carrier and storage means such as is afforded by a mechanical feedable strip or belt. Accordingly such belts have been adapted in various ways to hold articles in row formation, receiving slots, slits, pockets or flaps, for instance, being uniformly shaped and arranged to position and then release the successive articles as needed.

In view of the foregoing it is a primary object of this invention to provide a versatile and reliable machine for loading articles rapidly in evenly spaced relation on a belt. To this end, and in accordance with a feature of the invention, there is provided in combination with means for successively indexing equally spaced receiving recesses of a belt at a loading zone, raceway means having a delivery end adjacent to this zone, a reciprocable inserting tool movable into and out of the loading zone in time relation to the indexing means to move an endmost article from the delivery end and thrust it into a recess of the belt, and mechanism for automatically rendering the indexing means inoperative if an article is not thus mounted thereby avoiding occurrence of an article vacancy in the loaded belt. The avoidance of such a vacancy, it will be appreciated, can mean the avoidance in automatic production of an incomplete circuit assembly, for example.

After being loaded, the belt in the illustrative machine is led to a take-up reel to be wound thereon. If some or all of the articles have rectangular shaped bodies as happens in the case of some capacitors, for instance, it is desirable that their surfaces of longer dimension, considered lengthwise of the belt, be made to assume a parallel relation thereto in order to provide a neater and more compact finished package. In accordance with a further feature of the invention, therefore, novel means is provided in a belt loading machine for subjecting the articles mounted on a belt to forces operable to orient them uniformly about their respective axes.

The foregoing and other features of the invention together with novel arrangements of parts, will now be described in detail in connection with an illustrative embodiment and with reference to the accompanying drawings thereof, in which:

FIG. 3 is a view in front elevation of actuating mechanism partly shown in FIG. 2 and means for coordinating belt feed therewith;

FIG. 7 is a view in side elevation, with cover plates removed, of motor drive mechanism;

FIG. 8 is a vertical section taken on the line VIII—VIII of FIG. 7 and showing means coordinating belt drive mechanism with the component inserting means; and, FIG. 9 is a timing chart for the several operating elements.

Figure 1:
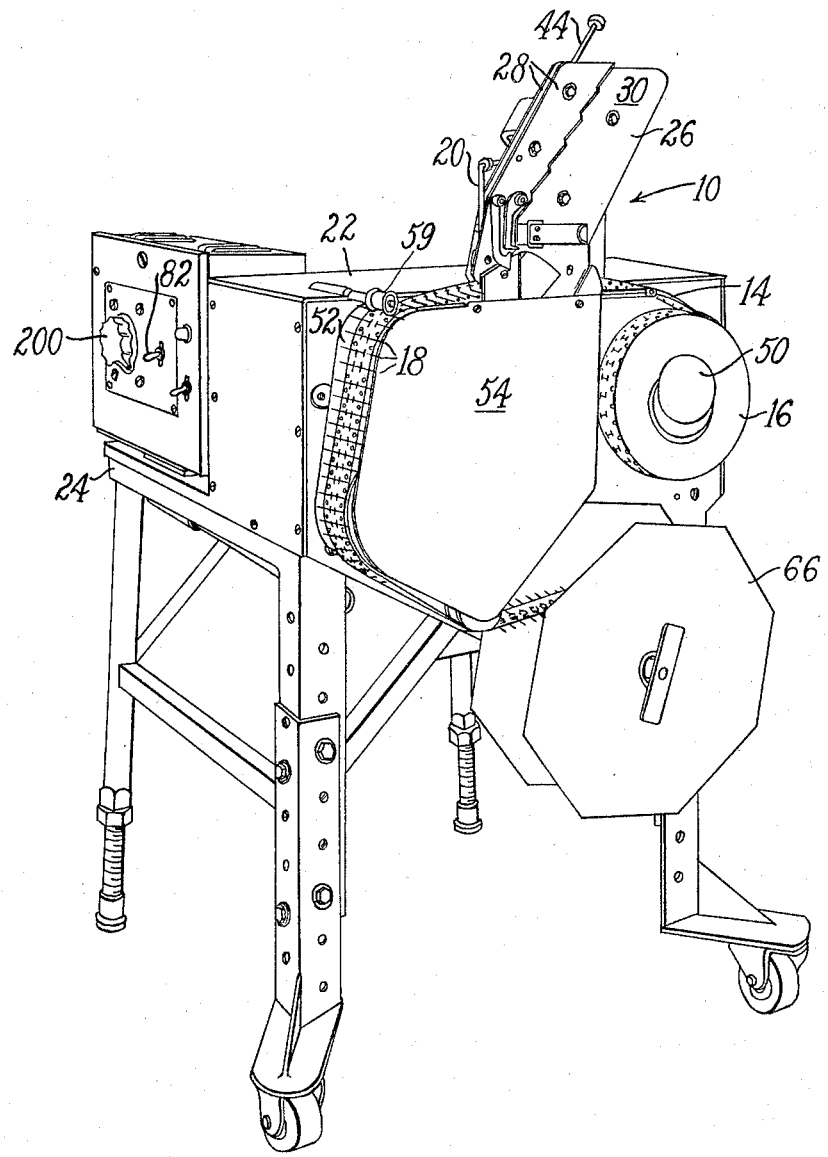
FIG. 1 is a perspective view of a component belt loading machine.

The illustrative machine generally comprises component supply mechanism 10 (FIGS. 1 and 2), belt feeding means generally designated 12 (FIG. 8) by which a belt 14 (FIGS. 4–6) to be loaded is unwound from a supply reel 16 (FIG. 1) and indexed step-by-step to receive successive components 18, a reciprocable inserter 20 (FIGS. 1, 2 and 4) and driving mechanism (FIGS. 2, 7 and 8) for properly coordinating the belt movements with the component inserting mechanism. Preferably a box-like housing or frame 22 of the machine is mounted on a table 24, and the component supplying mechanism 10 consists of a raceway unit 26 (FIGS. 1 and 2) secured onto the top of the frame 22. The unit 26 desirably includes laterally spaced pairs of complemental raceway plates 28, 30 between which oppositely extending component leads L descend in "waterfall" or non-skewing fashion, a row of the bodies C of the components being accommodated laterally between the plate pairs. Thus a pair of levers 32 (one only shown in FIG. 2) pivoted on a pin 34 in the plates 28, 28 has a lower detent and 36 which is urged counterclockwise by a spring 38 normally to restrain the flow of components 18 alined in the raceway. A pair of cooperating links or pawls 40 (one only shown in FIG. 2) pivoted at 42 to the raceway and urged counterclockwise by a spring 43 is arranged automatically to control parallelism and release one-by-one from the raceway its lowermost components as later explained, for mounting in the belt 14. Incidentally, for convenience in manually clearing the raceway unit of components when so desired, and especially if a jam has occurred, a rod 44 slidable endwise in bores of brackets 46, 46 (FIG. 2) secured to the plates 28 has its lower end connected to an arm of a lever 45 upon the pin 34 and is urged downwardly by a spring 48 confined on the rod between the lower bracket 46 and the arm. An operator may accordingly pull upwardly on the rod 44 to shift a detent arm 47 of the lever 45 and thus permit the escape of components from the bottom of the raceway as the detent end 36 is moved clockwise, as viewed in FIG. 2, and the links 40 are similarly displaced by the levers 32. Depressing the rod 44 will, of course, insure that components are prevented from flowing in the raceway. The rod should be depressed if a slidable trap door 49 (FIG. 2) on the plate 30 is to be retracted against its return spring.

Figure 2:
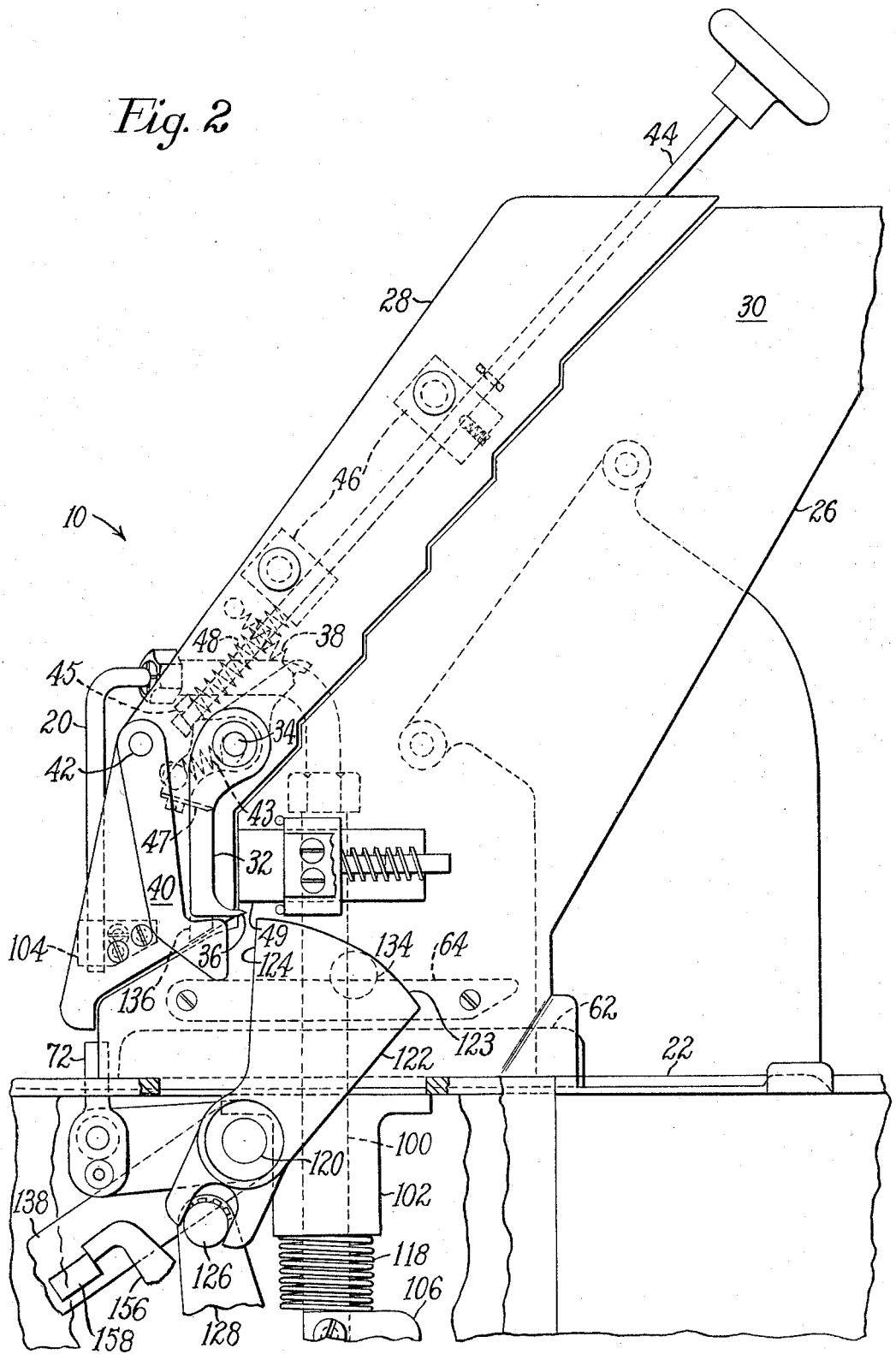
FIG. 2 is a view in enlarged front elevation with portions broken away, of an upper portion of the machine showing raceway feeding means, and article inserting means cooperative therewith, the parts being in their normal starting positions.

The belt feeding means 12 includes a hub 50 (FIG. 1) projecting from the frame 22 rotatably to support the reel 16 as its belt is unwound. The belt extends over and around most of a rounded enclosure 52 affixed to the front of the frame and having a cover plate 54. The latter may be removed for access to a pair of belt indexing sprocket wheels 56 (FIGS. 3 and 7) the teeth of which are adapted to mesh with spaced holes suitably preformed in the belt, and for access to a pair of idler sprocket wheels 58, and when used, to a so-called flattening wheel 60 (FIGS. 3 and 7) referred to later. A retaining spool 59 (FIG. 1) supported by the frame 22 cooperates with the wheels 56 in holding the belt against unwanted displacement. As the belt is successively indexed by means later described, it is preferably drawn over a former 62 (FIG. 4) longitudinally arranged to raise the mid or body-receiving portion of the belt in a locality just ahead of the loading zone, the former being secured on the frame 22 and adapted in this case to bend the tape transversely and thus facilitate its loading. A guide 64 secured above the former aids in directing the belt toward the loading zone, and "squares" the belt for reception of components having bodies as long as the belt slots 70. For accumulating the belt after loading, a take-up reel 66 (FIGS. 1 and 7) mounted on the front end of a shaft 68 journaled in the table is driven as subsequently explained. The belt is slit widthwise for the reception of each component body, successive slits 70 (FIGS. 5 and 6) being registered by the feeding means 12 with the vertical operating paths of the reciprocable inserter 20 and a later mentioned cooperative component sensing means in the form of a detector 72 (FIGS. 2 and 3).

Power operation of the feed sprockets 56, as well as of the inserter 20 and the component supply mechanism 10, is derived from a main shaft 74 (FIGS. 3, 7, and 8) as will next be explained. This shaft is rotatably driven from a variable speed motor-reducer 76 (FIG. 7) mounted on the table 24 and is journaled in the frame 22. The arrangement is such that, in order to avoid obstructing initial threading of a belt into the machine, a pair of switches (not shown) respectively controlled by cams 78, 80 (FIG. 7) on the shaft 74 operate a dynamic brake on the motor always to stop it, when a main switch 82 (FIG. 1) is turned off, with the inserter 20 in its up position. Each revolution of the main shaft 74 is effective to cause one component to be loaded. For driving the sprocket wheels 56 which are fixed on a shaft 84 (FIGS. 3, 7 and 8) journalled in the frame 22, a cam 86 (FIGS. 7 and 8) on the drive shaft 74 is engaged by a follower roll 88 carried by the lower portion of a triangular plate 89 pivoted on a shaft 112 journaled in the frame 22. Connected to the plate 89 is a lower end of a link 90. The upper end of the latter is connected to a crank arm 92 (FIG. 8) pivoted at one end on the shaft 84. The other end of the arm pivotally supports a spring-urged pawl 94 arranged to mesh with biased teeth of a gear 96 secured to the shaft 84. Accordingly, each rotation of the shaft 74 idly shifts the pawl 94 clockwise (as viewed in FIG. 8) one tooth and then operates reversely to advance the belt 14 one tooth spacing which, in effect, corresponds to the spacing between successive belt recesses provided by the slits 70. A spring 98 connecting the plate 89 to the table 24 maintains engagement of the roll 88 with its cam 86.

Figure 9:
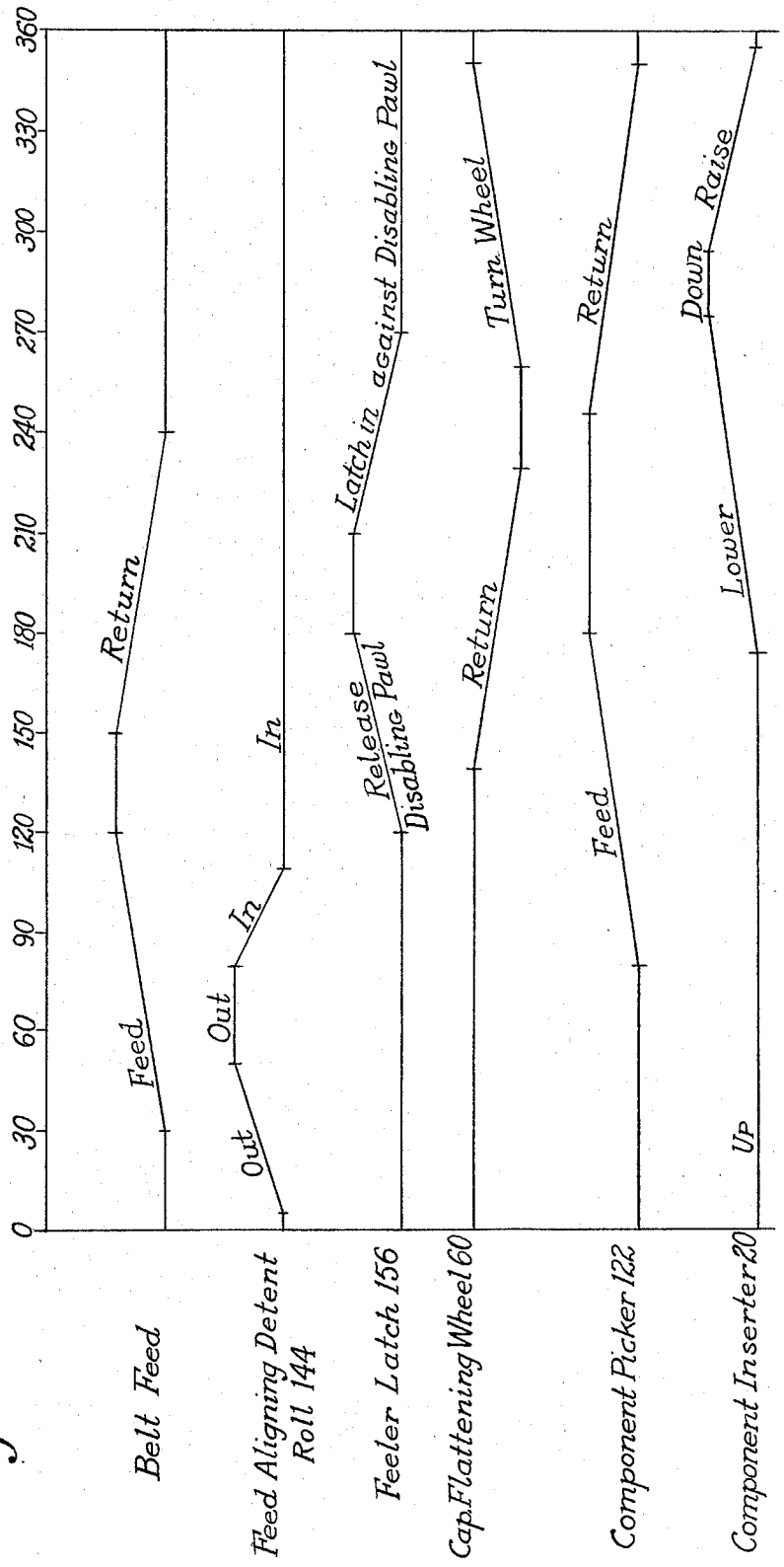

For reciprocating the inserter 20, its upper end is adjustably secured to a collet type post 100 vertically slidable in bearing bushings within housings 102, 102 (FIGS. 7 and 8), and its lower end extends through a guide 104 affixed between the plates 28. Secured to the post 100 is a collar 106 (FIG. 8) having a cam slot for receiving a roll 108 which is carried between a pair of parallel triangular pieces 110 pivotally secured on the shaft 112. A follower roll 114 carried by the pieces 110 is engaged by a cam 116 on the shaft 74 and accordingly cyclically reciprocates the inserter 20 vertically as indicated in FIG. 9, a compression spring 118 confined between the bushing housing 102 and the collar 106 maintaining the engagement of the roll 114 with its cam.

The component supply mechanism 10 is operated from the shaft 74 as will now be described with reference to FIGS. 2 and 3. A stub shaft 120 (FIGS. 2, 3 and 7) secured to the frame 22 pivotally supports a pair of oscillatory component picker levers 122 (only one shown) each having a forked lower end and a circular upper end 123, the leading edges 124 of which radially extend from the shaft 120 and are swung counter-clockwise (as viewed in FIGS. 2 and 4) to advance successive lowermost components trapped in the raceway between the detent end 36 and the pawls 40. For thus swinging the levers 122 their forked end receives a roll 126 (FIGS. 2–4) carried by a lever 128 pivoted on the stub shaft 120. The lever 128 is itself mounted on the shaft 112 and carries a pair of follower rolls 130, 130 (FIGS. 3 and 4) engageable with a dual cam 132 (FIGS. 4 and 7) secured on the main shaft 74. In swinging counterclockwise from the position shown in FIG. 2 to that shown in FIG. 4, the edges 124 also swing the pawls 40 clockwise (as seen in FIG. 2) to release the endmost component for delivery, and a roll 134 (FIGS. 2 and 4) carried by one of the levers 122 engages a depending tail 136 of the lever 32 simultaneously to shift the detent end 36 clockwise thus permitting the leads of the next component to descend onto the circular end portions 123. In the course of reverse, i.e., clockwise movement of the levers 122, the roll 134 allows the tail 136 to be spring-urged counter-clockwise so that the end 36 reenters the raceway and retains the row of components therein, and thereafter permits the mentioned "next" component to be positioned against the pawls 40 for feeding in the next cycle.

Figure 4:
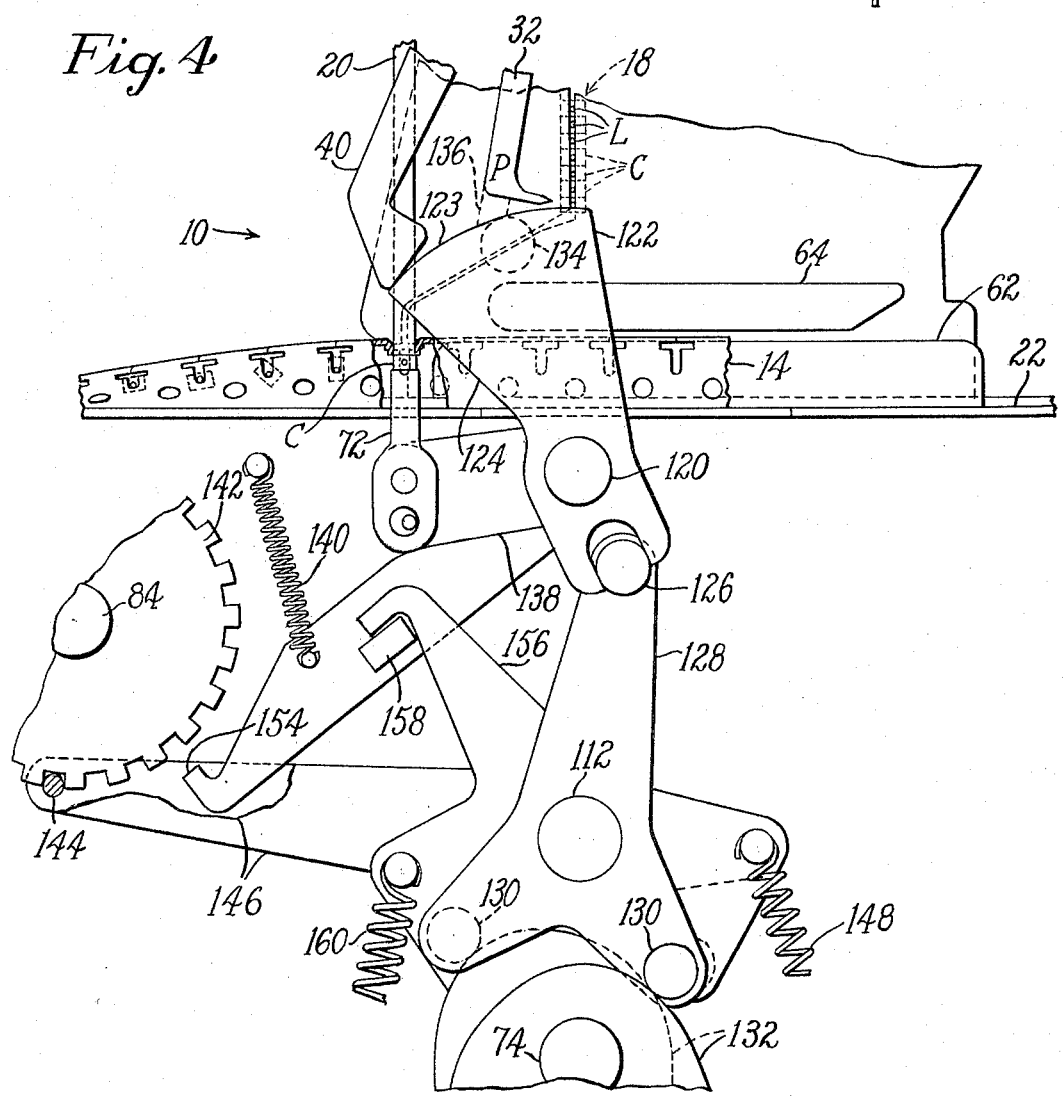
FIG. 4 is a view similar to FIG. 3 but at a later stage in a cycle and indicating relationship of parts when a component is present for insertion.

Means next to be described is provided for insuring that each successive pocket slit 70 registered above the detector 72 is loaded with a component. For this purpose the detector constitutes an upright sensor finger which is disposed beneath the belt and adjacent to an end of the former 62, and is not contacted by the inserter 20 when no component is present for loading, but is depressed by the inserter (on the order of 1/10th of an inch) when a component is being loaded in the belt. The detector is adjustably secured to one end of a lever 138 (FIGS. 2, 3 and 4) pivotally mounted on the shaft 120 and urged clockwise as seen in FIG. 3 by a spring 140. The machine is capable of loading up to about 9,000 components per hour, a fact which necessitates precision mechanism now to be explained whereby a failure to depress the detector (for want of a component being loaded) at once locks the belt feeding means 12 against operation. A gear 142 (FIGS. 3, 4 and 7) secured on the shaft 84 is circumferentially formed with square-shaped, ratchet teeth between the successive ones of which a roll 144 carried by a forked lever 146 is arranged to be received. This lever 146 has its roll 144 urged upwardly between the successive teeth by means of a spring 148 connecting the lever to the table 24, and the roll 144 is displaced from such engagement in each cycle by a cam 150 (FIG. 3) on the shaft 74 cooperative with a follower roll 152 carried by the lever 146. The diameter of the roll 144 is not quite equal to the distance between the successive teeth engaged. Hence the roll 144 when meshed acts, in effect, as an intermittent holding and angular positioning means for the shaft 84. Assuming a component is delivered beneath the inserter for loading, as shown in FIG. 4, a very carefully finished locking pawl portion 154 of the lever 138 adapted more precisely to mesh with the successive teeth is displaced downwardly from meshing relation by the detector 72 to prevent its locking the gear 142 against rotation and thus permitting continued normal intermittent belt feed.

When a component to be loaded is not delivered beneath the inserter, however, the angular upper end of a feeler latch lever 156 (FIGS. 2, 3, and 4) pivotally mounted on the shaft 112 abuts a latch 158 formed on the lever 138 as shown in FIG. 3 and the pawl portion 154 is held by the spring 140 in locking relation with the gear 142 preventing belt feed, such latch engagement of the lever 156 being yieldingly urged by a spring 160 (FIGS. 3 and 4) connecting the lever and a pin in the frame. Normally, there being a component delivered for loading, the pawl portion 154 will be disengaged from the gear 142, as shown in FIG. 4 and the latch lever 156, as controlled by a follower roll 162 carried thereby for engagement with a cam 164 (FIG. 3) on the shaft 74, will then extend over the latch 158 to prevent re-engagement of the pawl portion 154 with the gear 142 until the proper time in the inserting cycle.

As has been indicated the wheel 60 (FIGS. 3 and 7) is rotated, by means now to be described, for uniformly orienting the flat-sided bodies of angular belted components, such as the rectangular capacitor bodies C (FIGS. 4 and 6), but may be omitted when cylindrical component bodies are being loaded. The wheel 60 preferably has a smooth periphery and is rotatably carried by a shaft 166 (FIGS. 3, 7 and 8) having bearings in the frame 22. The shaft 166, like the shafts 68 and 84, is provided with friction brake means for preventing overtravel the details being shown with respect to shaft 68 in FIG. 7. Thus, a friction ring 168 is secured to the table (or on the frame), and arranged to be engaged by a leather covered portion of a drum 170 having a hub axially slidable on a pin extending transversely in the shaft 68. The drum is urged into frictional engagement with the ring 168 by a spring 172 confined on the shaft by a collar 174 axially adjustable on the shaft. For operating the wheel 60, the shaft 166 is intermittently driven in alternation with the feed sprocket wheels 56. To this end as shown in FIG. 8 a quadrilateral plate 176 pivoted on the shaft 112 carries a follower roll 178 engageable with a cam 180 on the shaft 74, such engagement being maintained by a spring 182. One end of the link 184 pivotally connected to the plate 176 has its other end connected to a crank arm 186 pivoted on the shaft 166. A pawl 188 having one end carried by the arm 186 has a toothed end adapted to engage with successive teeth of a ratchet wheel 190 secured on the shaft 166. This toothed engagement is yieldingly urged by a spring 192 connecting the arm 186 to the pawl. Accordingly the arrangement is such that, when belt feed is stopped after dragging components over the stationary wheel 60, the wheel 60 commences rotation in the same direction as that of the wheels 56 to engage and wipe the flat sides of a series of the component bodies. While the latter had upon initial belt insertion, occupied any and various angular positions about their leads as axes, the frictional stroking of the wheel 60 on the broader sides of the components, being more effective than on the narrower sides, now causes the broader sides to assume positions parallel to the belt 14 and assures a neater, more compact roll of belted components being accumulated on the take-up reel 66. To allow for the varying diameter of the roll of components on the reel, its supporting shaft 68 has affixed thereon a pulley 194 which is rotated by an endless belt 196 (FIGS. 7 and 8) having frictional drive from a collar 198 on the main shaft 74.

Figure 5:
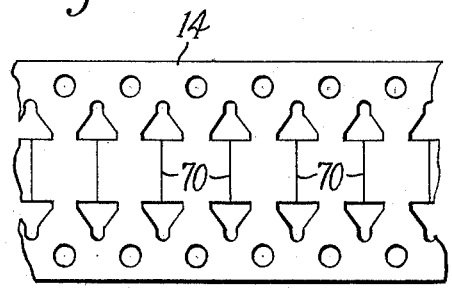
FIGS. 5 and 6 are plan views of typical belts to be loaded by the machine.
Figure 6:
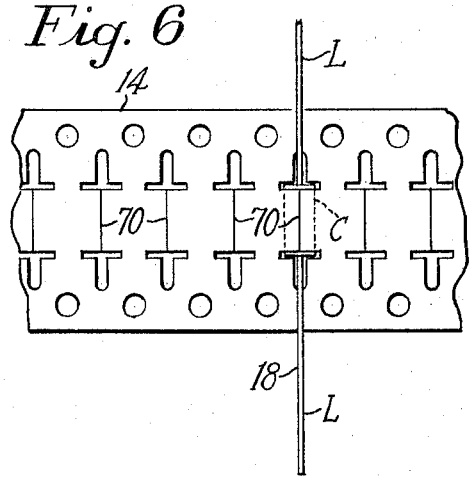

Operation of the machine will now be briefly reviewed. Having selected a desired operating speed for the motor 76 by means of a knob 200 (FIG. 1) and shifted the switch 82 to its "on" position, components stored in the raceway unit 26 (and preferably largely filling it) will be released one by one for loading into the belt 14. The component picker lever 122 and other operating elements driven from the main shaft 74 are actuated in proper cyclical sequence as indicated in FIG. 9. The arrangement is such that each endmost component advanced by the picker lever edges 124 is allowed to descend in the vertical delivery end of the raceway, and almost immediately thereafter the rapidly descending inserter 20 is lowered for engagement with the component body to depress it between widthwise tab edges of the belt provided by the slits 70, and tabs snapping above the body and the leads extending on the opposite side of the belt from the body. As illustrated in FIGS. 5 and 6, differently shaped slots in the belt may accommodate the respective leads to maintain their parallel relation.

On being thrust through the belt 14 as just described the component body acts on the detector 72 to deflect it downwardly. Accordingly, the pawl portion 154, which had been momentarily locking the wheels 56 and hence the belt slits 70 against movement during loading, is disengaged from the gear 142 and, while the latch lever 156 momentarily maintains this disengagement the mechanism shown in FIG. 8 including the ratchet operating link 90, the roll 88 and the cam 86, advance the next slits 70 to be loaded into register with the inserter and the detector. If no component has been loaded by the inserter, the detector 72 could not thus have disengaged the pawl portion 154 against resistance of the spring 140. An operator can remedy the potential belt void by simply replenishing the supply mechanism 10 and continuing normal operation of the machine.

From the foregoing it will be appreciated that a reliable, high capacity belt loader is provided. When the loaded belt, free of missing components, is removed on its reel 66 the latter may be directly mounted in an automatic component inserting machine for continuous production of printed wiring boards or the like.

Having thus described my invention, what I claim as new and desire to secure by Letters Patent of the United States is:

1. A machine for loading axial lead electronic components into a transversely slit belt in such manner that their bodies are disposed on one side of the belt and their leads are on the other side of the belt, said machine comprising means for intermittently moving the belt through a loading zone to position its slits successively therein, a reciprocable inserter operative from one side of the belt and toward and from the zone to thrust a component body through a belt slit while placing its leads against said side, means operative in timed relation to the belt moving means and said inserter for delivering the successive components to be loaded between the inserter and the belt and in alignment with a positioned belt slit, and a member frictionally engageable with flat sides of bodies of the components loaded in the belt to turn them on their leads into uniformly parallel relation to the belt.

2. In a component belt loading machine having means for intermittently feeding a carrier belt into and out of the operating zone of a reciprocable inserter, the belt having tabs and recesses formed for retaining the bodies of successive components in a row and transversely of the belt, means including a raceway having a delivery end adajcent to the operating path of the inserter for delivering from a supply successive components to be thrust by the inserter into said belt recesses to be retained by the tabs, and a former disposed to engage the belt longitudinally just ahead of the operating zone to bend the belt transversely and thereby facilitate its reception of the components from the inserter.

3. In a machine for loading electronic components in the recesses of a carrier belt, a frame, a drive shaft rotatably journaled therein, a reciprocable inserter operatively connected to the shaft for movement toward and from a loading zone, means for guiding the belt from a supply source through said zone to a take-up reel, a sprocket wheel rotatably supported by the frame and having intermittently operative connection with the shaft for advancing the belt step-by-step with respect to the guide means, component feed means operatively connected to the shaft for delivering successive components into the operating path of the inserter to be loaded into the belt recesses, and a sensing means responsive to engagement of the inserter with each component being loaded for controlling the component feed means.

References Cited by the Examiner
UNITED STATES PATENTS

| | | | |
|---|---|---|---|
| 2,372,702 | 3/1945 | Flaws | 53—57 X |
| 2,823,789 | 2/1958 | Henning | 198—131 |
| 2,988,199 | 6/1961 | Pinkham. | |
| 3,171,535 | 3/1965 | Harris | 198—131 |

FRANK E. BAILEY, *Primary Examiner.*

P. H. POHL, *Assistant Examiner.*